United States Statutory Invention Registration [19]

[11] Reg. Number: H730

Nock et al. [43] Published: Feb. 6, 1990

[54] HYDROXY-TERMINATED COPOLYFORMALS OF FLUORODIOLS WITH NITRODIOLS

[75] Inventors: Lori A. Nock, Baltimore; Horst G. Adolph, Burtonsville, both of Md.

[73] Assignee: The United States of America as represented by the Secretary of the Navy, Washington, D.C.

[21] Appl. No.: 389,211

[22] Filed: Aug. 2, 1989

[51] Int. Cl.[4] ..... C08G 2/18

[52] U.S. Cl. ..... 528/244; 568/615

*Primary Examiner*—John F. Terapane
*Assistant Examiner*—Chhaya Sayala
*Attorney, Agent, or Firm*—Kenneth E. Walden; Roger D. Johnson

[57] ABSTRACT

Energetic dihydroxy-terminated copolyformals which are formed from formaldehyde and fluorodiol and nitrodiol comonomers where the fluorodiol is $HOCH_2CF_2CF_2CF_2CF_2CH_2OH$, $HOCH_2CF_2CF_2CF_2CH_2OH$, $HOCH_2CF(CF_3)OCF_2CF_2CF_2CH_2OH$, $HOCH_2CF_2OCF_2CF_2OCF_2CH_2OH$, $HOCH_2CH_2(CF_2)_2CH_2CH_2OH$, $HOCH_2CH_2(CF_2)_4CH_2CH_2OH$, $HOCH_2CH_2(CF_2)_6CH_2CH_2OH$, $HOCH_2CH_2(CF_2)_8CH_2CH_2OH$, $HOCH_2CH_2(CF_2)_{10}CH_2CH_2OH$, or mixtures thereof, and the nitro diol is $HOCH_2CH_2N(NO_2)CH_2CH_2N(NO_2)CH_2CH_2OH$, $HOCH_2CH_2N(NO_2)CH_2C(NO_2)_2CH_2N(NO_2)CH_2CH_2OH$, $HOCH_2C(NO_2)_2CH_2OCH_2OCH_2C(NO_2)_2CH_2OH$, $HOCH_2CH_2N(NO_2)CH_2C(NO_2)_2CH_2OCH_2OCH_2OCH_2C(NO_2)_2CH_2N(NO_2)CH_2CH_2OH$, or mixtures thereof.

10 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HYDROXY-TERMINATED COPOLYFORMALS OF FLUORODIOLS WITH NITRODIOLS

BACKGROUND OF THE INVENTION

This invention relates to polymers and more particularly to energetic polymers containing fluoro and nitro groups.

For cast-curable polymers, high energy contents and low glass transition temperatures are desirable. Previously, several energetic polymers have been synthesized for use in cast-curable energetic compositions. Examples are poly(glycidylazide), poly(azido/nitratooxetanes), and nitropolyorthocarbonates. All of these polymers have various disadvantages resulting from limited chemical or thermal stability, high cost, and most importantly, ill-defined end group composition and functionality. Varying functionality makes it difficult to obtain reproducible mechanical properties and cure behavior of the energetic compositions in which such polymers are used as binders. Functionality differing significantly from 2 precludes the use of such polymers for the synthesis of block copolymers with thermoplastic elastomer properties, which are desired as binders for extrudable energetic compositions.

SUMMARY OF THE INVENTION

Accordingly an object of this invention is to provide new energetic polymers for use in explosive and propellant binders.

Another object of this invention is to provide energetic polymers having low glass transition temperatures.

A further object of this invention is to provide new difunctional hydroxy-terminated energetic polymers for use in the synthesis of block copolymers.

Yet another object of this invention is to provide high energy dihydroxy-terminated polymers having well-defined end group composition and functionality.

These and other objectives of this invention are accomplished by providing:

A dihydroxy-terminated copolyformal formed from

A. formaldelhyde and

B. a comonomer mixture of (1) a fluorodiol which is $HOCH_2CF_2CF_2CF_2CH_2OH$,
$HOCH_2CF_2CF_2CF_2CF_2CH_2OH$,
$HOCH_2CF(CF_3)OCF_2CF_2CF_2CH_2OH$,
$HOCH_2CF_2OCF_2CF_2OCF_2CH_2OH$,
$HOCH_2CH_2(CF_2)_2CH_2CH_2OH$,
$HOCH_2CH_2(CF_2)_4CH_2CH_2OH$,
$HOCH_2CH_2(CF_2)_6CH_2CH_2OH$,
$HOCH_2CH_2(CF_2)_8CH_2CH_2OH$,
$HOCH_2CH_2(CF_2)_{10}CH_2CH_2OH$, or mixtures thereof and (2) a nitrodiol which is $HOCH_2CH_2N(NO_2)CH_2CH_2N(NO_2)CH_2CH_2OH$,
$HOCH_2CH_2N(NO_2)CH_2C(NO_2)_2CH_2N(NO_2)CH_2CH_2OH$,
$HOCH_2C(NO_2)_2CH_2OCH_2OCH_2C(NO_2)_2CH_2OH$,
$HOCH_2CH_2N(NO_2)CH_2C(NO_2)_2CH_2OCH_2OCH_2C(NO_2)_2CH_2N(NO_2)CH_2CH_2OH$, or mixtures thereof, wherein the fluorodiol comprises about 10 to about 90 mole percent of the diol comonomer mixture with the nitrodiol being the remainder. The terminal functional groups are exclusively hydroxy groups.

DETAILED DESCRIPTION OF THE PREFERRED EMBODIMENT

The polymers of the present invention are prepared by the polycondensation of fluorodiols and nitrodiols with formaldehyde in sulfolane/boron trifluoride etherate solvent. The resulting fluoro and nitro monomeric units will be more or less randomly distributed in the polymeric chain with formal (—$OCH_2O$—) linkages between monomeric units. Due to the absence of side reactions in the propagation and termination steps of the polymerization reaction, the copolyformals described here are nearly 100 percent difunctional and exclusively terminated by hydroxy groups. This characteristic is useful because it results in reproducible curing in cast-curable compositions, and because it permits the synthesis of well-defined block copolymers.

The fluorodiols which may be used in this invention include:

(1) 2,2,3,3,4,4-hexafluoropentane-1,5-diol, $HOCH_2CF_2CF_2CF_2CH_2OH$;

(2) 2,2,3,3,4,4,5,5-octafluorohexane-1,6-diol, $HOCH_2CF_2CF_2CF_2CF_2CH_2OH$; and (3) 2,4,4,5,5,6,6-hepafluoro-2-trifluoromethyl-3-oxaheptane-1,7-diol, $HOCH_2CF(CF_3)OCF_2CF_2CF_2CH_2OH$;

(4) 2,2,4,4,5,5,7,7-octafluoro-3,6-dioxaoctane-1,8-diol, $HOCH_2CF_2OCF_2CF_2OCF_2CH_2OH$;

(5) 3,3,4,4-tetrafluorohexane-1,6-diol, $HOCH_2CH_2(CF_2)_2CH_2CH_2OH$;

(6) 3,3,4,4,5,5,6,6-octafluorooctane-1,8-diol, $HOCH_2CH_2(CF_2)_4CH_2CH_2OH$;

(7) 3,3,4,4,5,5,6,6,7,7,8,8-dodecafluorodecane-1,10-diol, $HOCH_2CH_2(CF_2)_6CH_2CH_2OH$;

(8) 3,3,4,4,5,5,6,6,7,7,8,8,9,9,10,10-hexadecafluorododecane-1,12-diol, $HOCH_2CH_2(CF_2)_8CH_2CH_2OH$;

(9) 3,3,4,4,5,5,6,6,7,7,8,8,9,9,10,10,11,11,12,12-eicosafluorotetradecane-1,14-diol, $HOCH_2CH_2(CF_2)_{10}CH_2CH_2OH$;

or mixtures thereof.

The 2,2,3,3,4,4-hexafluoropentane-1,5-diol is the least preferred because it is expensive.

The nitrodiols which may be used in this invention include:

(1) 3,6-dinitro-3,6-diazaoctane-1,8-diol, $HOCH_2CH_2N(NO_2)CH_2CH_2N(NO_2)CH_2CH_2OH$;

(2) 3,5,5,7-tetranitro-3,7-diazanonane-1,9-diol, $HOCH_2CH_2N(NO_2)CH_2C(NO_2)_2CH_2N(NO_2)CH_2CH_2OH$;

(3) 2,2,8,8-tetranitro-4,6-dioxanonane-1,9-diol, $HOCH_2C(NO_2)_2CH_2OCH_2OCH_2C(NO_2)_2CH_2OH$; and (4) 3,5,5,11,11,13-hexanitro-3,13-diaza-7,9-dioxapentadecane-1,15-diol, $HOCH_2CH_2N(NO_2)CH_2C(NO_2)_2CH_2OCH_2OCH_2C(NO_2)_2CH_2N(NO_2)CH_2CH_2OH$.

Mixtures of these nitrodiole may be used.

The comonomer mixture of the fluorodiol and the nitrodiol is composed of from about 10 to about 90 mole percent of the fluorodiol with the remainder of the diol comonomer mixture being the nitrodiol. The combination of fluorodiol and nitrodiol monomers provides polymers with much lower glass transition temperatures ($T_G$) than can be obtained with nitrodiol homopolyformals, and at the same time provides polymers with a significant energy content. The $T_G$ decreases with increasing mole percent of the fluorodiol. For example, while the homopolyformal of 3,6-dinitro-3,6-diazaoctane-1,8-diol melts above 100° C., a copolyformal of 85 mole percent of that nitrodiol with 15 mole percent of 2,2,3,3,4,4,5,5-octafluorohexane-1,6-diol is a liquid resin at room temperature with a $T_G$ of −12° C. and is readily soluble in ordinary organic solvents. Higher fluorodiol contents produce even lower $T_G$'s. Similarly, while 3,5,5,7-tetranitro-3,7-diazanonane-1,9-diol polyformal has a melting point of 80° C., a 50:50 molar ratio copolyformal of 3,5,5,7-tetranitro-3,7-ozanonane-1,9-diol and 2,2,3,3,4,4,5,5-octafluorohexane-1,6-diol is a liquid resin at room temperature. Likewise, while 2,2,8,8-tetranitro-4,6-dioxanonane-1,9-diol polyformal has a melting point of 50°-60° C., a 40:60 molar ratio copolyformal of 2,2,8,8-tetranitro-4,6-dioxanonane-1,9-diol and 2,2,3,3,4,4,5,5-octofluorohexane-1,6-diol is a viscous liquid resin at room temperature.

Examples 1 through 4 illustrate the conditions for preparing the copolyformals of this invention. The polycondensation of mixtures of the fluorodiols and nitrodiols with formaldehyde is accomplished at room temperature in sulfolane/boron trifluoride etherate solvent. The boron trifluoride etherate is added slowly to a mixture of the fluorodiol, nitrodiol, formaldehyde, and sulfolane to prevent overheating. After completion of the reaction, the copolyformal is treated with $H_2O_2$ to convert terminal hemiformal groups (—$CH_2OCH_2OH$) into hydroxy groups —$CH_2OH$. The copolyformal is then isolated as described in the examples.

Proof that true copolymers are formed, rather than mixtures of homopolymers, is based on the following observations: The differential scanning calorimetry (DSC) curves show a single glass transition temperature rather than two expected for a mixture of hompolymers; the gel permeation (GP) chromatogram shows the presence of a homogeneous UV active polymer whose UV and RI detector traces correspond very closely; the $^1$H-NMR spectrum shows a statistical ratio of the three possible formal linkages with the ratio varying with the feed ratio as expected.

The copolyformals of this invention preferably have a number average molecular weight of from about 1000 to about 6000 and more preferably from 2000 to 4000. The average molecular weight may be adjusted by varying the stoichiometry (ratio of formaldehyde to diols) and reaction conditions (amount of $BF_3$ etherate and solvent, temperature).

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

Poly(2,2,3,3,4,4,5,5-octafluorohexane-1,6-diol formal-co-3,6-dinitro-3,6-diazaoctane-1,8-diol formal). General Procedure, Described for 50:50 Composition.

$BF_3$ etherate, 6.3 mL, was added dropwise under a $N_2$ blanket to a stirred solution (prepared by several hours of mixing) of 6.01 g (0.0299 mol) of 2,2,3,3,4,4,5,5-octafluorohexane-1,6-diol, 5.46 g (0.0229 mol) of 3,6-dinitro-3,6-diazaoctane-1,8-diol, and 1.38 g of trioxane (formaldehyde) in 12 mL of dry (4A sieves) sulfolane. The mixture was stirred overnight at room temperature, diluted with 80 mL of dichloromethane, and stirred with 100 mL of water and 4 mL of 30% aqueous $H_2O_2$ for 2 hours. The organic layer was then stirred with 100 mL 1% aqueous KOH and 2 mL 30% $H_2O_2$, separated, washed with 60 mL of brine, and evaporated at 60° C/20 Torr. The remaining liquid was digested at 70° C with 65 mL portions of water until no sulfolane could be detected in the $^1$H-NMR spectrum (Varian 390). The copolymer was dissolved in 100 mL of dichloromethane, stirred overnight with 1 5 g silica gel (Kieselgel 60), filtered, and evaporated to give 10.77 g (89%) of a yellow/orange resin. $\overline{M}_n$=2080, $\overline{M}w$ =3300 (GPC); OH equ. wt. =1113 ($^{19}$F-NMR), 1070 (isocyanate method).

Similarly prepared were the following copolyformals using different molar ratios of 2,2,3,3,4,4,5,5-octafluorohexane-1,6-diol to 3,6-dinitro-3,6-diazaoctane-1,8-diol:

| Feed ratio (mol/mol) | Yield (%) | OH Equiv. Wt. (by $^{19}$F-NMR: values in brackets by Isocyanate Method) |
|---|---|---|
| 70/30 | 85 | 1025 [1028] |
| 30/70 | 85 | 1192 |
| 15/85 | 73 | 1182 |

Some of the physical properties of the polymers produced in Example 1 are listed in Table 1.

TABLE 1

THERMAL PROPERTIES AND VISCOSITIES OF $HOCH_2(CF_2)_4CH_2OH/HOCH_2CH_2N(NO_2)CH_2CH_2N(NO_2)—CH_2CH_2OH$ COPOLYFORMALS

| POLYMER[1] MOLAR RATIO | $M_n$ | $T_G$ (°C.; DSC) | TMA ONSET OF SOFTENING | TGA[2] T10% (°C.) | VISCOSITY AT 10 RAD/SEC(POISE) 50° C. | 75° C. | 100° C. |
|---|---|---|---|---|---|---|---|
| 15:85 | 1981 | −12.0 | −4.5 | 276 | 2825 | 185.5 | 37.5 |
| 30:70 | 2096 | −14.0 | −8.5 | 277 | 1686 | 149.2 | 27.6 |
| 50:50 | 2075 | −23.3 | −16.5 | 276 | 584.8 | 74.9 | 13.1 |
| 70:30 | 2139 | −34.5 | −26.0 | 281 | 253.3 | 34.3 | 8.3 |

[1]molar ratio of 2,2,3,3,4,4,5,5-octafluorohexane-1,6-diol to 3,5-dinitro-3,5-diazaheptane-1,7-diol.
[2]Temperature of 10% weight loss at heating rate of 2°/min.

EXAMPLE 2

Poly(2,2,3,3,4,4,5,5-octafluorohexane-1,6-diol formal-co-3,5,5,7-tetranitro-3,7-diazanonane-1,9-diol formal). General Procedure, Described for 50:50 Composition $BF_3$ etherate, 1.4 mL, was added dropwise, under a $N_2$ blanket, to a solution of 1.007 g (0.0038 mol) of 2,2,3,3,4,4,5,5-octafluorohexane-1,6-diol, 1.300 g (0.0038 mol) of 3,5,5,7-tetranitro-3-7-diazanonane-1,9-diol and 0.230g of trioxane (formaldehyde) in 2 mL of dry (4A sieves) sulfolane. The solution was stirred overnight at room temperature, diluted with 15 mL of dichloromethane, stirred with 20 mL of water and 0.8 mL of 30% aqueous $H_2O_2$ for 3 hours, separated and stirred with 20 mL 1% aqueous KOH +0.4 mL 30% $H_2O_2$ for 3 hours. The organic layer was washed with 15 mL of brine, evaporated at 60° C/20 Torr, and the remaining liquid was triturated at 80° C with 25 mL portions of water until no sulfolane could be detected by $^1$H-NMR (Varian 390). The resulting copolymer was dissolved in 30 mL of dichloromethane, the solution was stirred with 0.5g of silica gel (Kieselgel 60) overnight, filtered, and freed of solvent in vacuo (20 to .01 Torr) at 90° C for 8 hours. obtained was 2.2 g ( 9 %) of a resin, $\overline{M}_n$2410, $\overline{M}_w$=5120 (GPC), OH equ. wt. 2000 (by $^1$H-NMR), 1258 (by isocyanate method).

Other compositions were prepared similarly with the following modifications:

(a) for 80:20 and 90:10 molar ratios of 2,2,3,3,4,4,5,5-octafluorohexane-1,6-diol to 3,5,5,7-tetranitro-3,7-diazanonane-1,9-diol, 1.8 mL of $BF_3$ etherate was used;

(b) for a 20:80 molar ratio, 0.079 g of the fluorodiol, 0.898 g of the nitrodiol, 0.080 g of trioxane, 0.3 mL of $BF_3$ etherate was used; after stirring overnight, 10 dichloromethane was added and the mixture was poured into 30 mL of water containing 0.4 g $NaHCO_3$ and 0.4 mL of 30% $H_2O_2$. The reaction flask was rinsed with 10 mL of 1:1 dichloromethane/methyl acetate which was added to the above. The mixture was stirred vigorously for 3 hours until the organic solvents had evaporated, the residue was triturated with icewater and small amounts of dichloromethane. The resulting white solid was isolated by filtration.

$M_n$ of these polymers were estimated by GPC to be 2400±200; yields were 70–90%; the 10/90 and 20/80 polymers were solids, the others were resins.

EXAMPLE 3

Poly(2,4,4,5,5,6,6-heptafluoro-2-trifluoromethyl-3-oxaheptane1,7-diol formal-co-3,5,5,7-tetranitro-3,7-diazanonane-1,9-diol formal), General Procedure, Described for 50:50 Composition.

To a stirred solution of 1.258 g (0.0038 mol) of 2,4,4,5,5,6,6-heptafluoro-2-trifluoromethyl-3-oxaheptane-1,7-diol, 1.308 g (0.0038 mol) of 3,5,5,7-tetranitro-3,7-diazanonane-1,9-diol and 0.230 g of trioxane (formaldehyde) in 2 mL of dry (4A sieves) sulfolane under a $N_2$ blanket was added dropwise 1.4 mL of $BF_3$ etherate and the solution was then stirred overnight at room temperature. The reaction mixture was diluted with 15 mL of dichloromethane, and stirred with 20 mL of water and 0.8 ml of 30% aqueous $H_2O_2$ for 3 hours. The organic layer was stirred with 20 mL 1% aqueous KOH +0.4 mL 30% $H_2O_2$ for 3 hours and was washed with 15 mL of brine. The solvent was evaporated and the remaining liquid was digested at 80° C with 25 mL portions of water until no sulfolane could be detected in the $^1$H-NMR spectrum (Varian 390) The resulting copolymer was dissolved in 30 mL of dichloromethane and the solution was stirred with 0.5 g of silica gel (Kieselgel 60) overnight, filtered, and freed of solvent at 90° C/20 Torr for 8 hours. Obtained was 2.4g (≃90%) of polymer, $\overline{M}_n$2470, $\overline{M}_w$=5310 (GPC); OH equ. wt.=1600 ($^{19}$F-NMR), 1335 (isocyanate method).

Other compositions were prepared similarly with the following modifications:

(a) for 80:20 and 90:10 molar ratios of 2,4,4,5,5,6,6-heptafluoro-2-trifluoromethyl-3-oxaheptane-1,7-diol to 3,5,5,7-tetranitro-3,7-diazanonane-1,9-diol, 1.8 mL of $BF_3$ etherate was used;

(b) for a 10:90 molar ratio 0.096 g of the fluorodiol, 0.898 g of the nitrodiol, 0.082 g of trioxane, and 0.3 mL of $BF_3$ etherate were used following the modification described above for the 20:80 composition of Example 2.

$\overline{M}_n$ of these polymers were 2300±100 (by GPC); yields were 70–85%; the 10/90 polymer was a solid, the others were resins.

EXAMPLE 4

Poly(2,2,3,3,4,4,5,5-octafluorohexane-1,6-diol formal-co-2,2,8,8-tetranitro4,6-dioxanonane-1,9-diol formal), (60:40).

To a stirred solution of 3.600 g (0.0137 mol) of 2,2,3,3,4,4,5,5-octafluorohexane-1,6-diol, 2.317 g (0.0092 mol) of 2,2,8,8-tetranitro-4,6-dioxanonane-1,9-diol, and 0.588 g of trioxane (formaldehyde) in 3 mL of dry (4A sieves) sulfolane under a $N_2$ blanket was added dropwise 5.4 mL of $BF_3$ etherate. The solution was stirred overnight at room temperature, diluted with 45 mL of dichloromethane and stirred with 50 mL of water and 2 mL of 30% aqueous $H_2O_2$ for 3 hours. The organic layer was then stirred with 50 mL 1% aqueous KOH +1 mL 30% $H_2O_2$, separated, washed with 45 mL of brine and evaporated at 60° C./20 Torr. The remaining liquid was digested with three 30 mL portions of water and with 30 mL 50/50 MeOH/$H_2$, with heating up to 70° C. The resulting copolymer was dissolved in 50 mL dichloromethane, stirred with 0.8 g of silica gel (Kieselgel 60) overnight, filtered, and evaporated at 60° C./20 Torr. Obtained was 5.51 g (89%) of a viscous resin. The $\overline{M}_n$ of this polymer, which contained some low-molecular weight impurities, is estimated to be about 2500.

Obviously, numerous modifications and variations of the present invention are possible in light of the above teachings. It is therefore to be understood that within the scope of the appended claims the invention may be practiced otherwise than as specifically described herein.

What is claimed is:

1. A dihydroxy-terminated copolyformal formed from

A. formaldehyde and

B. a diol comonomer mixture of (1) a fluorodiol selected from the group consisting of
$HOCH_2CF_2CF_2CF_2CH_2OH$,
$HOCH_2CF_2CF_2CF_2CF_2CH_2OH$,
$HOCH_2CF(CF_3)OCF_2CF_2CF_2CH_2OH$,
$HOCH_2CF_2OCF_2CF_2OCF_2CH_2OH$,
$HOCH_2CH_2(CF_2)_2CH_2CH_2OH$,
$HOCH_2CH_2(CF_2)_4CH_2CH_2OH$,
$HOCH_2CH_2(CF_2)_6CH_2CH_2OH$,
$HOCH_2CH_2(CF_2)_8CH_2CH_2OH$,
$HOCH_2CH_2(CF_2)_{10}CH_2CH_2OH$,
and mixtures thereof, and (2) a nitrodiol selected from the group consisting of
$HOCH_2CH_2N(NO_2)CH_2CH_2N(NO_2)CH_2CH_2OH$,
$HOCH_2CH_2N(NO_2)CH_2C(NO_2)_2CH_2N(NO_2)CH_2CH_2OH$,
$HOCH_2C(NO_2)_2CH_2OCH_2OCH_2C(NO_2)_2CH_2OH$,
$HOCH_2CH_2N(NO_2CH_2C(NO_2)_2CH_2OCH_2OCH_2C(NO_2)_2CH_2N(NO_2)CH_2CH_2OH$, and
mixtures thereof, wherein the fluorodiol comprises from about 10 to about 90 mole percent of the diol comonomer mixture with the nitrodiol being the remainder, and wherein the terminal functional groups of the copolyformal are hydroxy groups.

2. The copolyformal of claim 1 wherein the fluorodiol is $HOCH_2CF_2CF_2CF_2CH_2OH$.

3. The copolyformal of claim 1 wherein the fluorodiol is $HOCH_2CF_2CF_2CF_2CF_2CH_2OH$.

4. The copolyformal of claim 1 wherein the fluorodiol is $HOCH_2CF(CF_3)OCF_2CF_2CF_2CH_2OH$

5. The copolyformal of claim 1 wherein the nitrodiol is $HOCH_2CH_2N(NO_2)CH_2CH_2N(NO_2)CH_2CH_2OH$.

6. The copolyformal of claim 1 wherein the nitrodiol is $HOCH_2CH_2N(NO_2)CH_2C(NO_2)_2CH_2N(NO_2)CH_2CH_2OH$.

7. The copolyformal of claim 1 wherein the nitrodiol is $HOCH_2C(NO_2)_2CH_2OCH_2OCH_2C(NO_2)_2CH_2OH$.

8. The copolyformal of claim 1 wherein the nitrodiol is $HOCH_2CH_2N(NO_2)CH_2C(NO_2)_2CH_2OCH_2OCH_2C(NO_2)_2CH_2N(N_2)CH_2CH_2OH$.

9. The copolyformal of claim 1 wherein the number average molecular weight of the copolyformal is from about 1000 to about 6000.

10. The copolyformal of claim 9 wherein the number average molecular weight of the copolyformal is from 2000 to 4000.

* * * * *